United States Patent [19]

Braunschweiler

[11] Patent Number: 4,843,899

[45] Date of Patent: Jul. 4, 1989

[54] GEAR DRIVE WITH INFINITELY VARIABLE TRANSMISSION RATIO

[76] Inventor: Hans G. Braunschweiler, Schwandenstrasse 36, 8802 Kilchberg, Switzerland

[21] Appl. No.: 53,630

[22] Filed: May 26, 1987

[30] Foreign Application Priority Data

May 27, 1986 [CH] Switzerland ............... 2130/86

[51] Int. Cl.$^4$ .............................................. F16H 29/12
[52] U.S. Cl. .................... 74/84 R; 74/111; 74/393; 74/394; 74/793
[58] Field of Search ............... 74/84 R, 111, 112, 393, 74/394, 793, 665 B, 674, 120, 121

[56] References Cited

U.S. PATENT DOCUMENTS 21,532  8/1940  Steinkamp ........................ 74/449

FOREIGN PATENT DOCUMENTS

| | | |
|---|---|---|
| 873340 | 2/1953 | Fed. Rep. of Germany . |
| 875114 | 3/1953 | Fed. Rep. of Germany . |
| 19458 | 11/1957 | Fed. Rep. of Germany . |
| 1075396 | 8/1960 | Fed. Rep. of Germany . |
| 2533706 | 2/1977 | Fed. Rep. of Germany . |
| 3241676 | 5/1984 | Fed. Rep. of Germany . |

*Primary Examiner*—Leslie A. Braun
*Assistant Examiner*—Scott Anchell
*Attorney, Agent, or Firm*—Werner W. Kleeman

[57] ABSTRACT

The gear drive or transmission comprises toothed elements whose radial spacing from a drive shaft can be selectively altered. There are two sets of such toothed elements whose aforementioned radial spacing can be infinitely varied in increments or sets. Each set of the toothed elements has operatively associated therewith at least one planetary gear which always meshes with one of the toothed elements of the associated set. The drive shaft generates, on the one hand, between the toothed elements and each of its associated planetary gear, on the other hand, a relative revolving or orbiting motion. Coacting with each planetary gear is an intermediate gear train which is positively or form-lockingly connected with one of the freely rotatably mounted starting elements of a differential gearing. A compensation element of the differential gearing is rotatably mounted at the end of a radially protruding arm rigidly connected for non-relative rotational movement with the drive shaft. The autorotation and the revolving or orbiting motion of this compensation element is transmitted by a gear train to a power take-off shaft. Since the toothed elements and thus the planetary gears are infinitely radially adjustable there also is altered the circumferential velocity at their point of engagement, so that there results the infinite variability of the transmission or gear ratio.

15 Claims, 4 Drawing Sheets

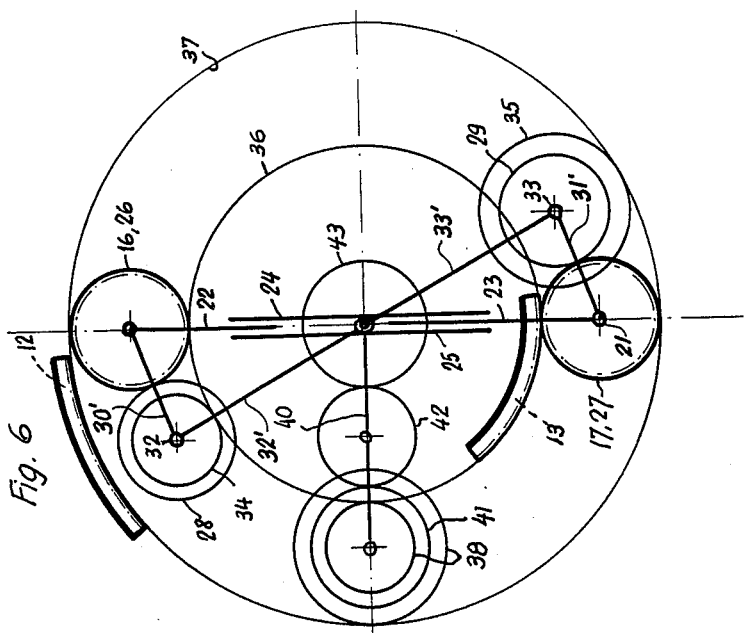
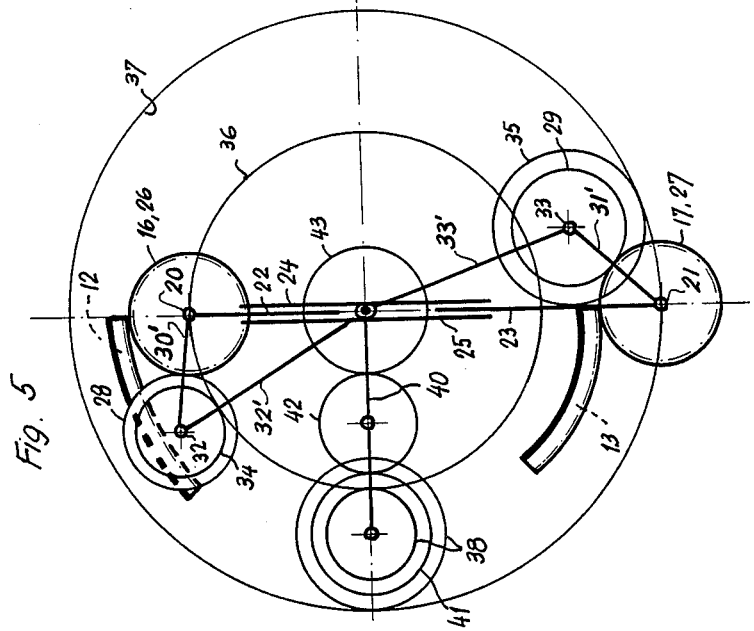

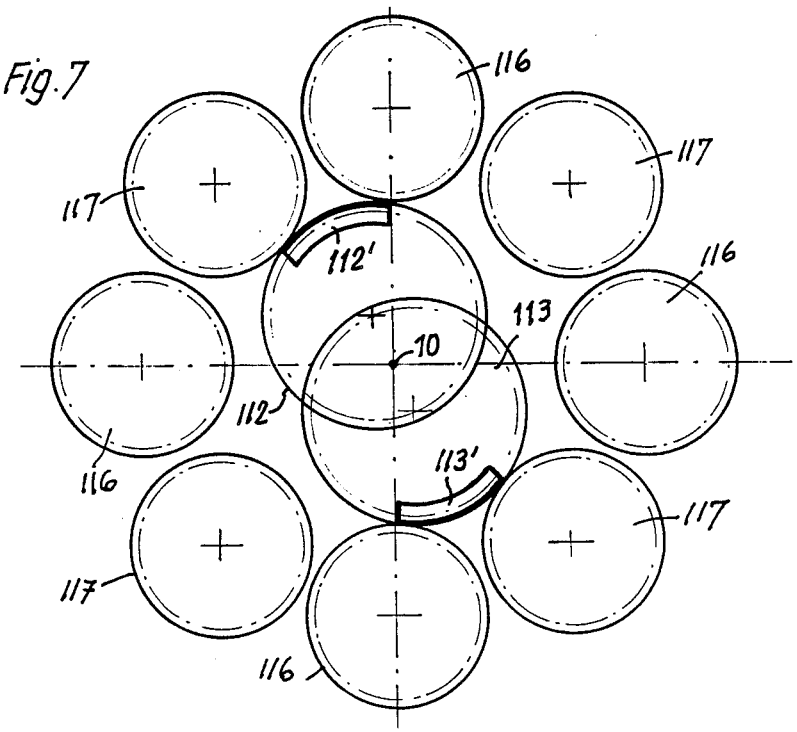

GEAR DRIVE WITH INFINITELY VARIABLE TRANSMISSION RATIO

BACKGROUND OF THE INVENTION

The present invention relates to a new and improved construction of a gear drive or power transmission with infinitely variable transmission or gear ratio.

Generally speaking, the gear drive or power transmission, or sometimes simply referred to herein as the transmission, with infinitely variable transmission or gear ratio of the present development is of the type comprising a drive shaft and a power take-off or driven shaft. There are also provided toothed elements whose radial spacing from the altered.

There are numerous gear drives or transmissions of this general type which are known in the art, but none of the heretofore known gear drives or transmissions affords and exclusively form-locking or positive connection between the drive shaft and the power take-off or driven shaft through the use of conventional toothed structure or components.

For instance, there is known from German Patent No. 875,114, granted Mar. 19, 1953, a gear drive or transmission of the previously mentioned type wherein a gear wheel or gear is subdivided into toothed segments. These toothed segments are each mounted in a fixed bearing and are slidingly arranged upon a drive disk along radii thereof, wherein the axis of rotation of the drive disk can be transversely adjusted in relation to that of the fixed bearing. In the gear train between the drive shaft and the power take-off or driven shaft of this gear drive or transmission there is, however, provided a force-locking or frictional coupling which transmits the torque or rotational moment and which possesses clamping spheres or balls which coact with inclined surfaces or ramps.

Other prior art constructions of gear drives or transmissions which work with circular displacements and/or cranks, have been disclosed in the German Patent No. 873,340, granted Feb. 26, 1953 and the German Patent No. 1,075,396, granted Aug. 11, 1960. These prior art constructions of gear drives or transmissions provide in the presence of a constant driving rotational speed a more or less oscillating power take-off rotational speed, and apart from the foregoing exhibit eccentrically revolving masses. The same also holds true for the gear drive or transmission which is known from the German Pat. No. 2,533,706, published Feb. 17, 1977.

SUMMARY OF THE INVENTION

Therefore with the foregoing in mind it is a primary object of the present invention to provide a new and improved construction of a gear drive or transmission possessing infinitely variable gear or transmission ratio and which is not afflicted with the aforementioned drawbacks and shortcomings of the prior art constructions.

Another significant object of the present invention is to provide a new and improved construction of a gear drive or transmission of the previously mentioned type which, notwithstanding the possibility of infinitely varying the transmission or gear ratio, affords a form-locking or positive connection between the drive shaft and the power take-off or driven shaft while essentially exclusively utilizing conventional toothed elements or structure.

A still further important object of the present invention is directed to a new and improved construction of gear drive or transmission with infinitely variable transmission or gear ratio which is relatively simple in construction and design, quite economical to manufacture, breakdown or malfunction, and requires a minimum of maintenance and servicing.

Now in order to implement these and still further objects of the invention, which will become more readily apparent as the description proceeds, the gear drive or transmission of the present development is manifested by the features that it contains at least two sets of the aforementioned toothed elements and whose radial spacing or distance from the lengthwise axis of the drive shaft can be infinitely adjusted in predeterminate increments or sets. Each set of the toothed elements has operatively associated therewith at least one planetary gear which meshes with the toothed elements of its related set, and the drive shaft generates a relative revolving or orbiting motion between the toothed elements and the planetary gears. Also the number and arrangement of the toothed elements and the at least one associated planetary gear of each set is undertaken such that one of the planetary gears always meshes with a toothed element of the associated set. Furthermore, a respective intermediate gear train or intermediate gearing is operatively associated with the at least one planetary gear of each set. Each such intermediate gear train or intermediate gearing is form-lockingly or positively coupled with an associated one of the starting elements of a differential gearing or differential gear unit. These starting elements are freely rotatably mounted. A compensation or compensating element which meshes with these starting elements of the differential gearing is rotatably mounted at the end of a radially protruding arm which is rigidly or fixedly connected for rotation with the drive shaft, and such compensation element is coupled by a gear train, detecting or responsive to the self-rotation or autorotation and revolving or orbiting motion of the compensation element, with the power take-off or driven shaft.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 5 is a simplified schematic of the gear drive or transmission depicted in FIG. 1 looking towards the power take-off or driven side;

FIG. 6 is a simplified schematic view of the gear drive or transmission depicted in FIG. 2 looking towards the power take-off or driven side; and FIG. 7 illustrates parts of a variant embodiment of the present invention generally showing only those elements constituting a modification of the arrangement of FIGS. 1 to 6.

DETAILED DESCRIPTION OF THE PREFERRED EMBODIMENTS

Figure 2:
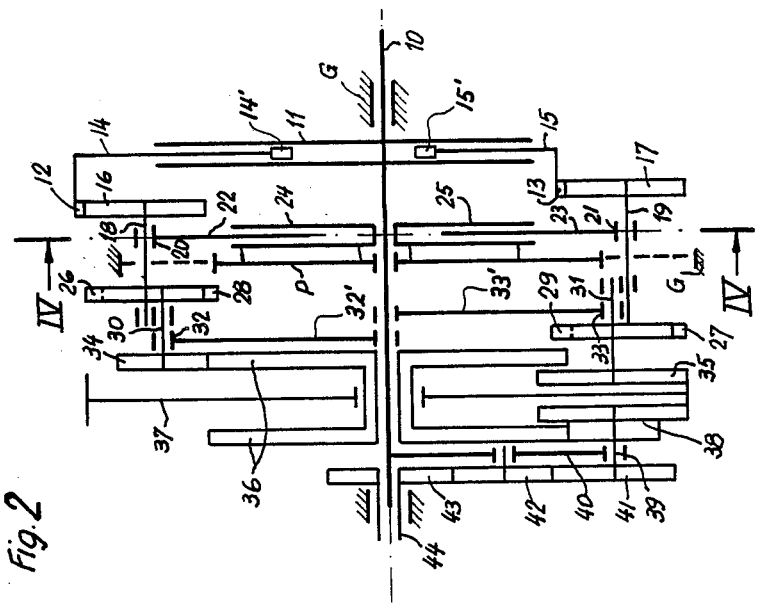
FIG. 2 depicts the gear drive or transmission shown in FIG. 1 in a different position.
Figure 1:
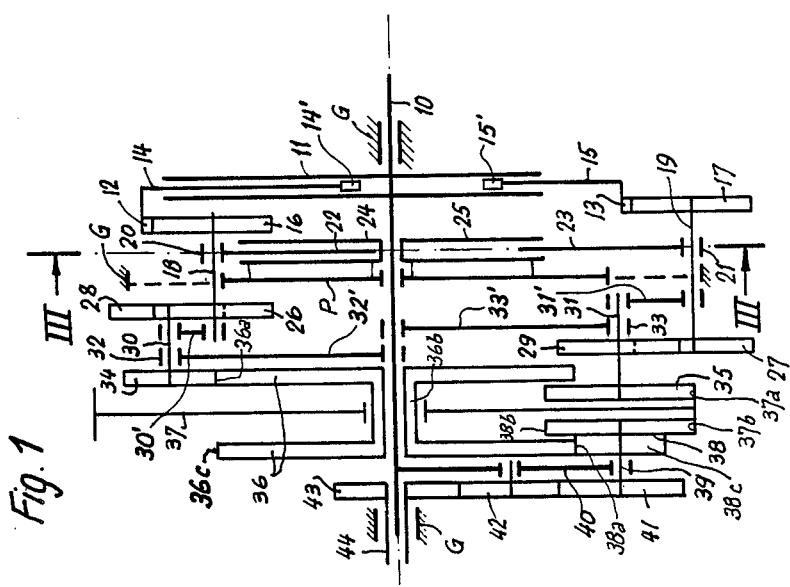
FIG. 1 schematically illustrates an exemplary embodiment of the gear drive or transmission in a first position thereof.
Figure 4:
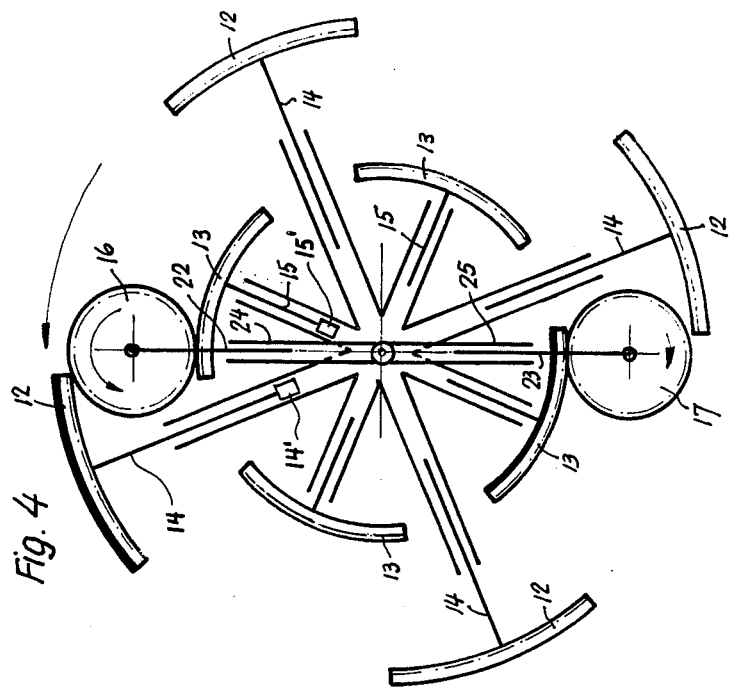
FIG. 4 is a view of the arrangement of FIG. 2 taken substantially along the section line IV—IV thereof.

Describing now the drawings, it is to be understood that only enough of the construction and details of the exemplary embodiments of gear drives or power transmissions of the present development have been depicted in the drawings as needed for those skilled in the art to readily understand the underlying principles and concepts of the present development. Turning now specifically to the first exemplary embodiment of gear drive or transmission as depicted in FIGS. 1 and 2, it will be observed that such gear drive or transmission possesses a drive shaft 10 having a lengthwise or longitudinal axis and upon which there is rigidly mounted for rotation a suitable carrier or support disk 11 which has only been schematically depicted. As best seen by also referring to FIGS. 3 and 4, upon this carrier or support disk or disk member 11 there are suitably mounted, for instance, four arcuate-shaped and internally toothed or tooth segments 12 and four arcuate-shaped externally toothed or tooth segments 13 in such a manner that they are guided and radially displaceable in opposed or opposite relationship, such as by the schematically depicted adjusting elements or means 14' and 15', respectively. This has been particularly indicated in FIGS. 1 and 2 in that the carrier or support disk 11 has been represented by two lines between which engages or there is arranged a respective guide element or guide means 14 and 15 which carries an associated one of the toothed or tooth segments 12 and 13, respectively. The toothed or tooth segments 12 are located in one plane and the toothed or tooth segments 13 in an axially offset or axially shifted plane.

Figure 3:
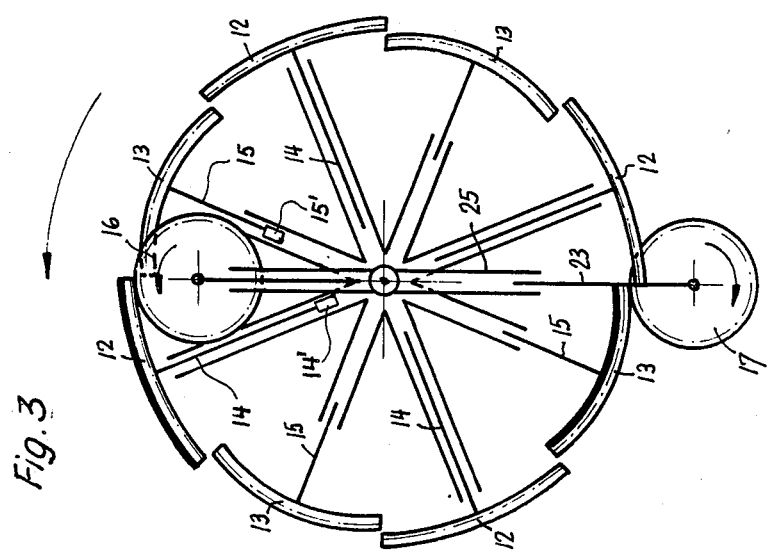
FIG. 3 is a view of the arrangement of FIG. 1 taken substantially along the section line III—III thereof.

It will be observed from the drawings, particularly FIG. 3, that both sets of the toothed segments 12 and 13 each contain the same number of toothed segments, and moreover, the toothed segments of one set are arranged to be rotatably or angularly shifted through approximately one half of the angle between neighboring toothed segments of such one set in relation to the toothed segments of the other set.

The toothed segments 12 sequentially come into meshing engagement or mesh with an associated planetary gear 16 and similarly the toothed segments 13 mesh with an associated planetary gear 17. The shafts 18 and 19 of these planetry gears 16 and 17, respectively, are mounted in associated bearings or support means 20 and 21, respectively, which, in turn, are radially displaceable with respect to the drive shaft 10, however are coupled rigidly or fixedly for non-relative rotation with the housing G which has only been schematically indicated. This has been represented in that the bearings 20 and 21 are seated at the end of an associated guide arm 22 and 23, respectively, which are displaceable in guide sleeves 24 and 25, respectively, which, in turn, are connected with a plate or plate member P secured at the housing G.

Seated upon the shaft or shaft members 18 and 19 are also the first or starting gears 26 and 27 of an associated intermediate gear train or intermediate gearing 26, 28, 34 and 27, 29 and 35, which first or starting gears 26 and 27 can be the same as the planetary gears 16 and 17, respectively. Meshing with the first or starting gears 26 and 27 are second gears 28 and 29, respectively, and the associated shafts or shaft members 30 and 31, respectively, of which are mounted in bearings 32 and 33, respectively, which as a function of the radial position of the first gears 26 and 27 can follow the same. As show in the drawings, a link 30' interconnects the bearing 20 and the bearing 32 so as to maintain constant the distance between the two bearings 20 and 32. Likewise, as shown, a link 31' interconnects the bearing 21 and the bearing 31 so as to maintain constant the distance between the two bearing 21 and 31. Again likewise as shown, links 32' and 33' respectively connect the bearing 32 and 33 with associated drive shaft bearings. At the end of the shafts or shaft members 30 and 31 there is seated a respective gear 34 and 35, respectively.

The gear or gear member 34 meshes with the one set of external toothing or teeth 36a of a double gear or gear member 36 which is freely rotatably mounted upon the drive shaft 10. On the other hand, the gear or gear member 35 meshes with the one set of internal toothing or teeth 37a of the double gear or gear member 37 which is freely rotatably mounted upon the hub 36b of the double gear 36. The double gears or gear members 36 and 37 form the starting or initial elements of a differential gearing of differential gear unit whose compensation or compensating element 38c is formed by a further externally toothed double gear 38. This double gear 38 meshes by means of its one set of external teeth 38b with the other set of external teeth 36c of the double gear 36 and with its other set of external teeth 38b with the other set of internal teeth 37b of the double gear 37. This double gear or gear member 38 is seated upon a shaft 39 which, in turn, is mounted at the end of an arm or arm member 40 which radially protrudes from the drive shaft 10 and which is rigidly connected for rotation with such drive shaft 10. The lengthwise axis of the compensation or compensating element 38c i.e. the double gear or gear member 38 of the differential gearing is shown disposed substantially parallel to the lengthwise axis of the drive shaft 10.

Finally, there is seated upon the shaft or shaft member 39 a further gear 41 which transmits the revolving or orbiting motion of the compensation element (double gear 38) upon which there is superimposed its autorotation or rotational movement about its own axis, by means of a further gear 42 rotatably mounted at the arm or arm member 40 to an output gear 43. This output gear 43 is seated upon a power take-off in which there is also mounted the end of the drive shaft 10. The lengthwise axis of the drive shaft 10 and that of the power take-off or driven shaft 44 are shown to be substantially coincident or located essentially along the same axis.

The double gear 38 performs a revolving or orbiting motion whose revolving or orbital rotational speed corresponds to the rotational speed of the drive shaft 10. The double gear 38 additionally performs an autorotation or rotational movement about its own axis at a rotational speed which, among other things, is dependent upon the rotational speed difference between the double gears or gear members 36 and 37.

The transmission or gear ratio from the planetary gear 16 up to the location of the double gear 36 is constant. Also constant is the transmission or gear ratio from the planetary gear 17 up to the location of the double gear 37. However, the rotational speed of the planetary gear 16 is dependent upon the radial spacing of the tooth or toothed segments 12 from the drive shaft 10, and the rotational speed of the planetary gear 17 is dependent upon the spacing or distance of the tooth or toothed segments 13 from the drive shaft 10. The circumferential velocity or speed of both of the tooth or toothed segments 12 and 13 increases with such increasing distance or spacing and decreases with such reduced distance or spacing.

By suitable selection of the size or dimensions of all of the gearing or transmission elements it is possible for the power take-off or driven shaft 44, in one extreme or terminal position of the tooth or toothed segments 12 and 13, to rotate in opposite direction or counter to the drive shaft 10 and during the course of the transition into the other extreme or terminal position of the tooth or toothed segments 12 and 13 while passing through the rotational speed 0 to rotate in the same rotational direction as the drive shaft 10.

Furthermore, it is here mentioned that in the arrangement shown in FIGS. 1 to 6 (and this also can hold true for the modified embodiment to be discussed shortly with respect to FIG. 7) the respective axis of the drive shaft 10, the toothed elements 12 and 13, the planetary gears 16 and 17, the starting elements 36 and 37 of the differential gearing and the power take-off shaft 44 are arranged substantially parallel to one another.

As will best be seen by referring to the modification depicted in FIG. 7, the principle of the so-to-speak "infinitely adjustable circumferential velocity or speeds" also can be realized in that the tooth or toothed segments 12 are replaced by an internally or externally toothed spur gear 112 and the tooth or toothed segments 13 by an appropriate spur gear 113, wherein the axes of these spur gears are arranged diametrically opposite one another in relation to the drive shaft 10 and its lengthwise axis, and these spur gears 112 and 113 can be oppositely or opposingly adjusted in their spacing or distance from the drive shaft 10. These spur gears 112 and 113 which, if desired, do not perform any autorotation, rather only a revolving or orbiting motion, have operatively associated therewith a set of, for instance, four planetary gears 116 and 117, respectively. The respective axis of the planetary gears 116 and 117 can be arranged along or upon a circle disposed essentially concentric to the lengthwise axis of the drive shaft 10. This circle has a diameter which is governed by the position of the associated spur gears 112 and 113. Instead of the full or circular spur gears 112 and 113 there also can be provided only appropriately configured arcuate-shaped tooth or toothed segments 112' and 113' respectively.

On the other hand, it is also possible to secure the tooth or toothed segments 12 and 13 and the spur gears 112 and 113, as the case may be, against performing a revolving or orbiting motion and instead to place the associated planetary gears 16 and 17 and 116 and 117, respectively, into a revolving or orbiting motion by the action of the drive shaft 10, so that due to their rolling upon the tooth or toothed segments 12 and 13 or the spur gears 112 and 113, as the case may be, such are additionally caused to perform an autorotation.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A gear drive with infinitely variable transmission ratio, comprising:
a drive shaft;
a power take-off shaft cooperating with said drive shaft;
said drive shaft having a lengthwise axis;
toothed elements radially spaced from the lengthwise axis of the drive shaft;
means for altering the radial spacing of said toothed elements from said lengthwise axis of the drive shaft;
said toothed elements defining at least two sets of said toothed elements whose radial spacing from the lengthwise axis of the drive shaft can be infinitely adjusted in sets;
at least one respective planetary gear operatively associated with each set of the toothed elements and coming into meshing engagement with the toothed elements of such set;
said drive shaft generating a relative revolving movement between the toothed elements and the planetary gears;
the number and arrangement of said toothed elements and the at least one respective planetary gear of each set being undertaken such that one of the planetary gears always is in meshing engagement with a toothed element of the associated set;
a respective intermediate gear train operatively cooperating with the planetary gear of each set;
a differential gearing having a respective starting element provided for each intermediate gear train;
each said intermediate gear train being form-lockingly coupled with one of the associated starting elements of the differential gearing;
said starting elements being freely rotatably mounted;
said differential gearing further including a compensation element meshing with the starting elements of the . differential gearing;
a radially protruding arm member mounted rigidly for rotation at said drive shaft;
said radially protruding arm member having an end;
said compensation element being rotatably mounted at the end of said radially protruding arm member;
a gear train responsive to autorotation and revolving motion of the compensation element; and
said compensation element being operatively coupled by means of said gear train with the power take-off shaft.

2. The gear drive as defined in claim 1, wherein:
the toothed elements of each set respectively comprise a multiplicity of toothed segments driven to perform a revolving motion by the drive shaft; and
a respective one of said planetary gears being operatively associated with the toothed segments of the associated set of toothed segments; and
means for enabling radial displacement of each said planetary gear.

3. The gear drive as defined in claim 2, wherein:
the toothed segments of one set comprise internally toothed segments; and
the toothed segments of the other set comprise externally toothed segments.

4. The gear drive as defined in claim 3, wherein:
said altering means comprise means for positively adjusting in opposite sense the radial spacing of the tooth segments of the one set and the radial spacing of the tooth segments of the other set from the lengthwise axis of the drive shaft.

5. The gear drive as defined in claim 2, wherein:
said altering means comprise means for positively adjusting in opposite sense the radial spacing of the toothed segments of the one set and the radial spacing of the toothed segments of the other set from the lengthwise axis of the drive shaft.

6. The gear drive as defined in claim 2, wherein:
both sets of said toothed segments each have the same number of toothed segments; and
the toothed segments of one set are arranged so as to be angularly shifted through approximately one half of the angle enclosed between neighboring toothed segments of such set in relation to the toothed segments of the other set.

7. The gear drive as defined in claim 2, further including:
a common carrier disk operatively connected with the drive shaft;
the toothed segments of the one set and the toothed segments of the other set being mounted at said common carrier disk;
said common carrier disk being rigidly connected for rotation with the drive shaft;
said means for altering the radial spacing of said toothed elements comprising radially extending guide means provided for said common carrier disk; and
said toothed segments being displaceable in said common carrier disk by means of said radially extending guide means.

8. The gear drive as defined in claim 1, wherein:
each said drive shaft, said toothed elements, said planetary gears, said starting elements of the differential gearing and the power take-off shaft have a respective axis;
the axes of the drive shaft, the toothed elements, the planetary gears, the starting elements of the differential gearing and the power take-off shaft are arranged substantially parallel to one another.

9. The gear drive as defined in claim 8, wherein:
said compensation element of said differential gearing has an axis; and
the axis of the compensation element of the differential gearing being located substantially parallel to the lengthwise axis of the drive shaft.

10. The gear drive as defined in claim 1, wherein:
each toothed element comprises a toothed spur gear;
a plurality of said planetary gears being operatively associated with said spur gears;
each of said planetary gears having an axis;
each of said spur gears having an axis;
said axes of said spur gears being arranged diametrically opposite to the lengthwise axis of the drive shaft;
the axes of the spur gears and the lengthwise axis of the drive shaft having a radial spacing from one another which can be oppositely altered;
the axes of the planetary gears operatively associated with each of the spur gears being located upon a circle which is substantially concentric to the lengthwise axis of the drive shaft; and
said circle having a diameter which is governed by the position of the spur gears.

11. The gear drive as defined in claim 10, wherein:
said toothed spur gears comprise internally toothed spur gears.

12. The gear drive as defined in claim 10, wherein:
said toothed spur gears comprise externally toothed spur gears.

13. The gear drive as defined in claim 1, wherein:
said power take-off shaft has an axis; and
the lengthwise axis of the drive shaft and the axis of the power take-off shaft being arranged substantially coincident with respect to one another.

14. A gear drive with infinitely variable gear ratio, comprising:
a drive shaft;
a power take-off shaft operatively associated with said drive shaft;
said drive shaft having a lengthwise axis;
toothed elements radially spaced from the lengthwise axis of the drive shaft;
means for predeterminately altering the radial spacing of said toothed elements from said lengthwise axis of the drive shaft;
said toothed elements defining; at least two sets of said toothed elements;
at least one respective planetary gear operatively associated with each set of the toothed elements and meshing with the toothed elements of such set;
said drive shaft generating a relative orbiting movement between the toothed elements and the planetary gears;
said toothed elements and the at least one respective planetary gear of each set being structured such : that one of the planetary gears always is in meshing engagement with a toothed element of the associated set;
a respective intermediate gear train operatively cooperating with the planetary gear of each set;
a differential gearing having a respective starting element provided for each intermediate gear train;
each said intermediate gear train being positively coupled with one of the associated starting elements of the differential gearing;
said starting elements being freely rotatably mounted;
said differential gearing further including a compensation element meshing with the starting elements of the differential gearing;
a radially protruding arm member fixedly mounted for rotation at said drive shaft;
said radially protruding arm member having an end;
said compensation element being rotatably mounted at the end of said radially protruding arm member;
a gear train responsive to autorotation and revolving motion of the compensation element; and
said compensation element being operatively coupled by means of said gear train with the power take-off shaft.

15. A transmission for coupling an input shaft having a lengthwise axis and an output shaft with an infinitely variable transmission ratio and comprising:
support means connected to the input shaft for conjoint rotation therewith on an input side of the transmission;
a predetermined number of first drive elements mounted at respective first angularly substantially equally spaced radial arms of said support means;
a predetermined number of second drive elements mounted at respective second angularly substantially equally spaced radial arms of said support means;
said predetermined number of first drive elements and said predetermined number of second drive elements being arranged along respective orbital paths extending around said input drive shaft;
adjusting means for infinitely variably adjusting said first radial arms and said second radial arms with respect to their radial spacing from the lengthwise axis of the input shaft by substantially equal amounts and in opposite directions;

a carrier arm connected to the input shaft for conjoint rotation therewith on an output side of the transmission;

a further drive element having an axis and journaled for rotation about its axis at said carrier arm at a predetermined radial distance from the lengthwise axis of said input shaft;

said further drive element being drivingly coupled to an output shaft drive member;

a first gear train drivingly connecting said predetermined number of first drive elements on the input side of the transmission end said further drive element at said carrier arm on the output side of said transmission;

a second gear train drivingly connecting said predetermined number of second drive elements on the input side of the transmission and said further drive element of said carrier arm on the output side of said transmission;

said predetermined number of first and second drive elements on the input side of said transmission being positively and form-lockingly connected with said output shaft drive member; and said further drive element mounted at said carrier arm constituting a compensating element compensating, during operation of the transmission, rotational speed differences transmitted through the first and second gear trains and thereby being set into rotation about its axis for varying the transmission ratio in correspondence with a combined change in the radial spacings of said first and second radial arms on the input side of the transmission.

* * * * *